(12) United States Patent
Jiang et al.

(10) Patent No.: US 6,320,764 B1
(45) Date of Patent: Nov. 20, 2001

(54) REGULATION CIRCUIT FOR A POWER CONVERTER AND METHOD OF OPERATION THEREOF

(76) Inventors: Yimin Jiang, 4005 Bullock Dr., Plano, TX (US) 75023; Hengchun Mao, 3108 Buena Vista Dr., Plano, TX (US) 75025

(*) Notice: Subject to any disclaimer, the term of this patent is extended or adjusted under 35 U.S.C. 154(b) by 0 days.

(21) Appl. No.: 09/539,690

(22) Filed: Mar. 31, 2000

(51) Int. Cl.[7] ............................ H02M 3/335; G05F 1/14
(52) U.S. Cl. ............................................. 363/17; 323/255
(58) Field of Search .................... 363/17, 132; 323/255, 323/258, 340

(56) References Cited

U.S. PATENT DOCUMENTS

| | | | |
|---|---|---|---|
| 5,406,051 | * | 4/1995 | Lai ................................. 219/130.1 |
| 5,477,113 | * | 12/1995 | Christoffersson ................... 315/278 |
| 5,691,607 | * | 11/1997 | Zawislak et al. ................... 315/308 |
| 5,825,164 | * | 10/1998 | Williams ............................ 323/255 |
| 5,936,857 | * | 8/1999 | Jacobs et al. ....................... 363/100 |
| 5,999,433 | * | 12/1999 | Hua et al. ........................... 363/132 |
| 6,011,704 | * | 1/2000 | Coleman ............................. 363/37 |

OTHER PUBLICATIONS

U.S. patent application Ser. No. 09/540,957, filed Mar. 31, 2000, entitled "Regulation circuit for a Power Converter and Method of Operation Thereof" by Yimin Jiang, et al.

* cited by examiner

*Primary Examiner*—Adolf Deneke Berhane

(57) ABSTRACT

A regulation circuit for a voltage-fed power converter, a method of operation thereof and a power converter employing the circuit or the method. The power converter has an inverter switch adapted to transfer power to a transformer. In one embodiment, the regulation circuit includes a switching network coupled to a tapped winding of the transformer. The switching network is operable to vary a turns ratio of the transformer, thereby regulating an output voltage of the power converter.

18 Claims, 3 Drawing Sheets

REGULATION CIRCUIT FOR A POWER CONVERTER AND METHOD OF OPERATION THEREOF

CROSS-REFERENCE TO RELATED APPLICATION

This application is related to U.S. patent application, Ser. No. 09/540,957 entitled "CURRENT-FED DC/DC CONVERTER WITH MULTILEVEL TRANSFORMER AND METHOD OF OPERATION THEREOF," filed concurrently herewith, commonly assigned with the present application and incorporated herein by reference.

TECHNICAL FIELD OF THE INVENTION

The present invention is directed, in general, to power conversion and, more specifically, to a regulation circuit for a voltage-fed power converter, a method of operating the regulation circuit and a voltage-fed power converter employing the circuit or the method.

BACKGROUND OF THE INVENTION

A power converter is a power processing circuit that converts an input voltage waveform into a specified output voltage waveform. In many applications requiring a DC output, switched-mode DC/DC converters are frequently employed to advantage. DC/DC converters generally include an inverter, a transformer, a rectifier on a secondary side of the transformer and an output filter. The inverter generally includes switching devices (inverter switches), such as field effect transistors (FETs), that convert a DC input voltage to an AC voltage. The transformer transforms the AC voltage to another value and the rectifier delivers the desired DC voltage to the output filter. Conventionally, the rectifier includes a plurality of rectifying diodes that conduct the load current only when the rectifying diodes are forward-biased in response to the input waveform to the rectifier. Finally, the output filter eliminates large fluctuations in the output voltage to provide a substantially constant DC voltage at the output of the converter.

A typical power converter embodying the principles as described above is a voltage-fed power converter, such as half-bridge power converter. A conventional half-bridge power converter includes two inverter switches coupled to a control circuit, at least one transformer, a rectifier and a filter. This type of power converter generally operates as follows. The first and second inverter switches conduct current in a complimentary manner to convert an input DC voltage into an AC voltage to be applied across the primary windings of the transformer. The rectifier then rectifies the voltage from the secondary windings of the transformer and the filter smooths and filters the rectified voltage to develop an output voltage for delivery to a load. The control circuit monitors a characteristic (e.g., the output voltage) of the power converter and adjusts the duty cycle of the inverter switches to ultimately control the output voltage. The output voltage may be maintained at a relatively constant level despite relative fluctuations in the input voltage and the load. There are many possible methods of regulating such power converters including, for instance, pulse width modulation (PWM). PWM is one of the more widely used control and switching methods and, as such, will not be herein discussed.

The conversion efficiency of conventional regulated power converters is related to the duty cycle of the inverter switches. To achieve maximum conversion efficiency in the conventional power converter described above, the inverter switches usually should be operated at a full duty cycle. For example, in a half-bridge power converter, each inverter switches would be on for about 50% of the duty cycle (e.g., in a symmetrical mode of operation). However, the constant operation of the inverter switches does not allow the output voltage to be regulated in response to variations, for example, in the load or the input voltage. To regulate the output voltage, the inverter switches in conventional power converters, such as the half-bridge converter described above, should be operated in an asymmetrical mode of operation or a symmetrical mode of operation (with reduced duty cycles), wherein the duty cycles of the inverter switches are adjusted to regulate the output voltage.

In asymmetrical half-bridge converters, one of the inverter switches has a first duty cycle (D) while the other inverter switch has a second duty cycle (1-D). In this methodology, if the first duty cycle (D) is less than 50%, the second duty cycle (1-D) would be greater than 50%. In symmetrical half-bridge converters, both inverter switches are operated with a duty cycle (D). However, the duty cycle (D) is necessarily below the full duty cycle.

One problem with operating a power converter asymmetrically is the substantial power loss across at least one of the inverter switches and at least one of the rectifying diodes. Regulating the output voltage of an asymmetrical power converter results in unnecessary power losses because at least one inverter switch is exposed to a substantially larger voltage than the other inverter switch. In addition, at least one of the diodes used in the rectifier is also exposed to similar high voltage stresses. Specifically, when the converter is working at its highest input voltage, one of the inverter switches and one of the diodes in the asymmetrical half-bridge power converter may be subjected to approximately twice the voltage required during low voltage operation. Thus, one of the inverter switches, as well as one of the diodes, must be substantially larger than their respective counterparts to withstand this high voltage stress. The larger components necessary to withstand the increased voltage stress, however, increase the cost of manufacturing the power converter. Further, the larger components may tend to incur a greater power loss thereacross.

The inverter switches in a symmetrical converter should be operated below full duty cycle. Reducing the duty cycle of the inverter switches invariably results in a corresponding time period wherein the power converter is not processing power ("dead time") Whenever a power converter operates with any significant amount of dead time, the power converter is not operating at maximum efficiency.

Accordingly, what is needed in the art is a voltage-fed power converter capable of operating at a substantially full duty cycle (symmetrical operation), while maintaining the ability to regulate the output voltage to the desired level.

SUMMARY OF THE INVENTION

To address the above-discussed deficiencies of the prior art, the present invention provides a regulation circuit for a voltage-fed power converter, a method of operation thereof and a voltage-fed power converter employing the circuit or the method. The power converter has an inverter switch adapted to transfer power to a transformer. In one embodiment, the regulation circuit includes a switching network coupled to a tapped winding of the transformer. The switching network is operable to vary a turns ratio of the transformer, thereby regulating an output voltage of the power converter.

The present invention, in one aspect, introduces the broad concept of varying a turns ratio of a transformer to regulate the output voltage of the converter. The output voltage of the power converter may thus be maintained at a substantially constant level without continually changing a duty cycle of the inverter switch. The present invention recognizes that, in some voltage-fed power converter topologies (e.g., half-bridge and full-bridge), it may be undesirable (due to, for instance, efficiency or electromagnetic interference concerns) to continually change the duty cycle of the inverter switch to regulate the output voltage of the power converter. For example, a symmetric half-bridge converter is more efficient when its inverter switches are operated at a full duty cycle. The present invention, therefore, employs the switching network, rather than continually modulating the duty cycle of the inverter switch, to regulate the output voltage of the power converter.

In one embodiment of the present invention, the switching network includes a regulation switch coupled to the tapped winding. The regulation switch may be selected from the group consisting of (1) a metal oxide semiconductor field-effect transistor, (2) a bipolar junction transistor, (3) an insulated gate bipolar transistors and (4) a gate turn-off thyristor. Those skilled in the pertinent art are familiar with the above-listed switches. Of course, other controllable switches are well within the broad scope of the present invention.

In one embodiment of the present invention, the switching network includes a diode coupled to the tapped winding. The diode may prevent reverse current flow through the tapped winding. Of course, an active switch may be employed in place of the diode.

In one embodiment of the present invention, wherein the tapped winding is a tapped secondary winding and the power converter further has a (first) rectifier coupled to the tapped secondary winding, the switching network includes first and second diodes coupled to opposing ends of the tapped secondary winding and a regulation switch coupled between the first and second diodes and an output of the power converter. The regulation switch is thus operable to regulate (e.g., increase) an output voltage of the power converter. The first and second diodes form a second rectifier, whose output voltage may be added to the output voltage delivered by the first rectifier.

In one embodiment of the present invention, wherein the tapped winding is a first tapped primary winding and the transformer has a second tapped primary winding, the switching network includes a diode and a regulation switch coupled to the first tapped primary winding and a second diode coupled to the second tapped primary winding. In a related embodiment, the switching network further includes a second regulation switch coupled to the second tapped primary winding.

In one embodiment of the present invention, wherein the tapped winding is a tapped primary winding, the switching network includes first and second regulation switches coupled to the tapped primary winding and a diode coupled between one of the first and second regulation switches and the inverter switch. In an embodiment to be illustrated and described, the power converter further has a second inverter switch. The switching network may further include a second diode coupled to the second inverter switch.

In one embodiment of the present invention, the power converter is selected from the group consisting of a push-pull power converter, a half-bridge power converter and a full-bridge power converter. Conventional power converter topologies are familiar to those skilled in the pertinent art. Of course, the principles of the present invention may be applied to other power converter topologies not disclosed herein.

The foregoing has outlined, rather broadly, preferred and alternative features of the present invention so that those skilled in the pertinent art may better understand the detailed description of the invention that follows. Additional features of the invention will be described hereinafter that form the subject of the claims of the invention. Those skilled in the pertinent art should appreciate that they can readily use the disclosed conception and specific embodiment as a basis for designing or modifying other structures for carrying out the same purposes of the present invention. Those skilled in the pertinent art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
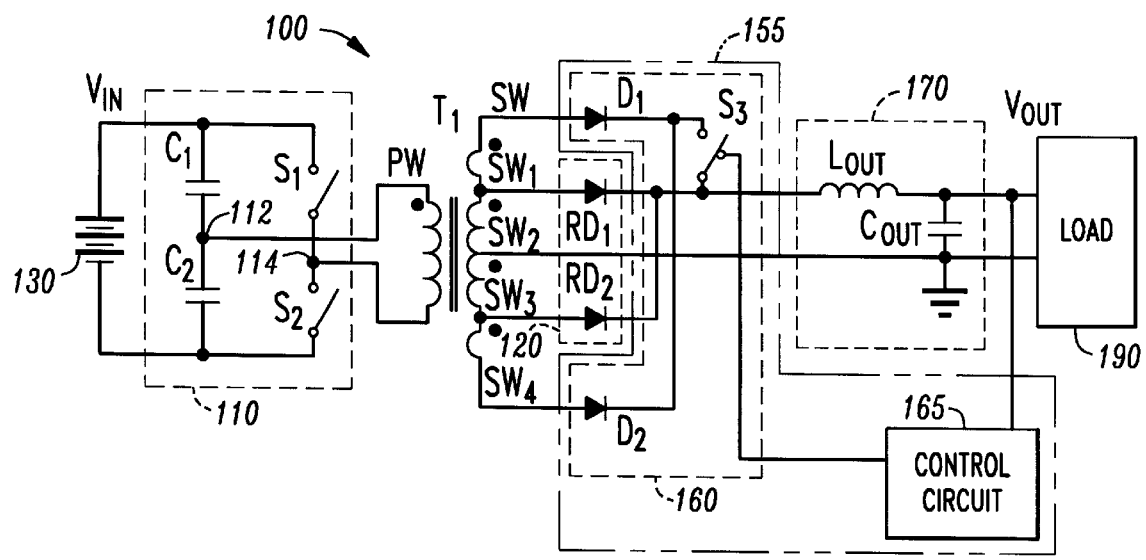
FIG. 1 illustrates a schematic diagram of an embodiment of a power converter constructed according to the principles of the present invention.

Referring initially to FIG. 1, illustrated is a schematic diagram of an embodiment of a voltage-fed power converter 100 constructed according to the principles of the present invention. The power converter 100 includes an inverter 110 coupled to a DC power source 130 having an input voltage $V_{IN}$. The power converter 100 further includes a transformer $T_1$ having a primary winding PW coupled to the inverter 110, and a secondary winding SW. In the illustrated embodiment, wherein the transformer $T_1$ is a multi-level transformer, the secondary winding SW is a tapped winding having first, second, third, and fourth winding portions $SW_1$, $SW_2$, $SW_3$, $SW_4$.

The power converter 100 further includes a rectifying circuit 120 having first and second rectifying diodes $RD_1$, $RD_2$ coupled to the second and third winding portions $SW_2$, $SW_3$. The power converter 100 further includes an output filter 170, having an output inductor $L_{OUT}$ and an output capacitor $C_{OUT}$, coupled to the rectifying circuit 120. The output filter 170 filters the rectified waveform from the rectifying circuit 120 to supply an output voltage $V_{OUT}$ to a load 190 coupled to an output of the power converter 100. The power converter 100 further includes a regulation circuit 155 having a switching network 160 coupled to the first and fourth winding portions $SW_1$, $SW_4$. The regulation circuit 155 further has a control circuit 165 that monitors the output voltage $V_{OUT}$ of the power converter 100 and operates the switching network 160 to vary a turns ratio of the transformer $T_1$ thereby regulating the output voltage $V_{OUT}$.

In the illustrated embodiment, the power converter 100 is a half-bridge power converter. The inverter 110, therefore, includes first and second capacitors $C_1$, $C_2$ series-coupled across the DC power source 130. The inverter 110 further includes first and second inverter switches $S_1$, $S_2$ series-coupled across the DC power source 130. Although the first and second inverter switches $S_1$, $S_2$ are illustrated as generic switches, those skilled in the pertinent art realize that the first and second inverter switches $S_1$, $S_2$ may be any type of switch, including metal-oxide-semiconductor field effect transistors (MOSFETs), bipolar junction transistors (BJTs), insulated gate bipolar transistors (IGBTs) and gate turn-off thyristors (GTOs). Of course, other switches not listed above may also be employed to advantage. The primary winding PW is coupled to a first node 112 (between the first and second capacitors $C_1$, $C_2$) and a second node 114 (between the first and second inverter switches $S_1$, $S_2$). The first and second inverter switches $S_1$, $S_2$ alternately switch to apply the input voltage $V_{IN}$ across the primary winding PW.

In the illustrated embodiment, the switching network 160 includes a regulation switch $S_3$. The switching network further includes a first regulation diode $D_1$ coupled between the first winding portion $SW_1$, and the regulation switch $S_3$. The switching network still further includes a second regulation diode $D_2$ coupled between the fourth winding portion $SW_4$ and the regulation switch $S_3$.

The power converter 100 operates as follows. The first and second inverter switches $S_1$, $S_2$ are alternately switched to establish a voltage across the first and second capacitors $C_1$, $C_2$ that is applied to the primary winding PW. Those skilled in the art are familiar with half-bridge power converters and their operation. Of course, other embodiments of the power converter 100, including, without limitation, a push-pull power converter and a full-bridge power converter are well within the broad scope of the present invention.

The first and second rectifying diodes $RD_1$, $RD_2$ of the rectifying circuit 120 rectify the waveform received from the second and third winding portions $SW_2$, $SW_3$ to establish a nominal rectified voltage delivered to the output filter 170. Likewise, the first and second regulation diodes $D_1$, $D_2$ of the switching network 160 rectify the waveform received from the first and fourth winding portions $SW_1$, $SW_4$ to develop an additional voltage, which is delivered to the output filter 170 only when the regulation switch $S_3$ is conducting. The conduction of the regulation switch $S_3$ therefore effectively increases the output voltage $V_{OUT}$ delivered by the rectifying circuit 120 by combining both the nominal rectified voltage from the rectifying circuit 120 and the additional voltage from the first and second regulation diodes $D_1$, $D_2$ of the switching network 160 to develop the output voltage $V_{OUT}$.

The control circuit 165 (e.g., a pulse-width-modulation controller) senses the output voltage $V_{OUT}$ and controls the switching of the regulation switch $S_3$ to regulate the output voltage $V_{OUT}$. Because the regulation switch $S_3$ is employed to regulate the output voltage $V_{OUT}$ of the power converter 100, the first and second inverter switches $S_1$, $S_2$ of the half-bridge inverter may be operated symmetrically and at full duty cycle. Symmetrical full duty cycle operation allows the RMS current and therefore the conduction losses in the first and second inverter switches $S_1$, $S_2$ to be reduced substantially. Of course, the first and second inverter switches $S_1$, $S_2$ of the half-bridge inverter may also be operated at less than the full duty cycle, for example, when soft starting the power converter 100.

Figure 2:
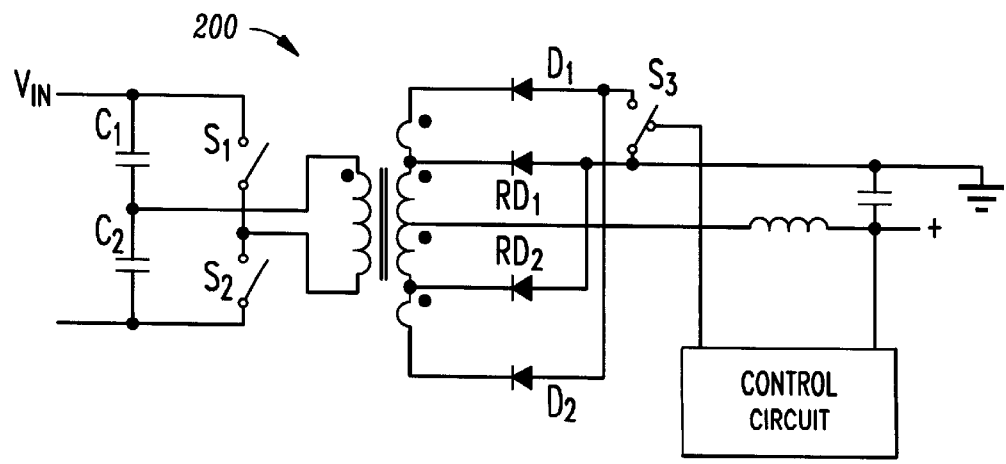
FIG. 2 illustrates a schematic diagram of another embodiment of a power converter constructed according to the principles of the present invention.

Turning now to FIG. 2, illustrated is a schematic diagram of another embodiment of a power converter 200 constructed according to the principles of the present invention. The power converter 200 is similar to the power converter 100 illustrated and described with respect to FIG. 1, with the exception of the polarities of rectifying diodes $RD_1$, $RD_2$ and the first and second regulation diodes $D_1$, $D_2$. The operation of the power converter 200 is substantially similar to the operation of the power converter 100 illustrated and described with respect to FIG. 1 and will not be repeated.

Figure 3:
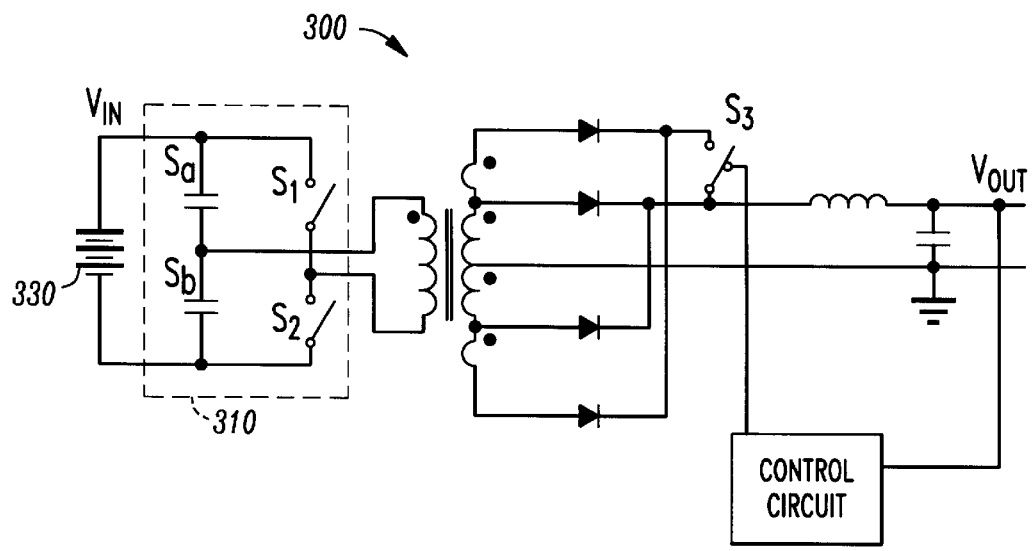
FIG. 3 illustrates a schematic diagram of another embodiment of a power converter constructed according to the principles of the present invention.

Turning now to FIG. 3, illustrated is a schematic diagram of another embodiment of a power converter 300 constructed according to the principles of the present invention. The power converter 300 is a full-bridge power converter employing a full-bridge inverter 310 in place of the half-bridge inverter 110 illustrated and described with respect to FIG. 1. The operation of full-bridge inverters is familiar to those skilled in the pertinent art and, as a result, will not be herein discussed.

Figure 4:
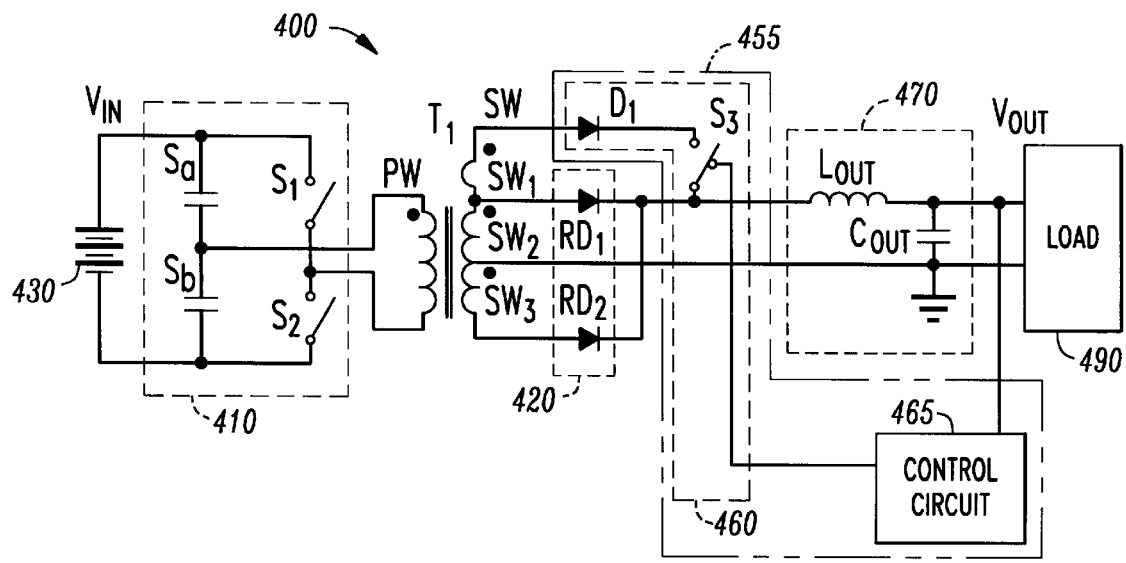
FIG. 4 illustrates a schematic diagram of another embodiment of a power converter constructed according to the principles of the present invention.

Turning now to FIG. 4, illustrated is a schematic diagram of another embodiment of a power converter 400 constructed according to the principles of the present invention. The power converter 400 includes an inverter 410 coupled to a DC power source 430 (e.g., a battery or a rectifier). The power converter 400 further includes a transformer $T_1$ having a primary winding PW coupled to the inverter 410 and a secondary winding SW. In the illustrated embodiment, the secondary winding SW is a tapped winding having first, second and third winding portions $SW_1$, $SW_2$, $SW_3$. The power converter 400 further includes a rectifying circuit 420 having first and second rectifying diodes $RD_1$, $RD_2$ coupled to the second and third winding portions $SW_2$, $SW_3$ of the secondary winding SW. The power converter 400 further includes an output filter 470, having an output inductor $L_{OUT}$ and an output capacitor $C_{OUT}$, coupled to the rectifying circuit 420. The output filter 470 filters the rectified waveform from the rectifying circuit 420 to supply an output voltage $V_{OUT}$ to a load 490 coupled to an output of the power converter 400.

The power converter 400 further includes a regulation circuit 455 having a switching network 460 coupled to the first winding portion $SW_1$. The regulation circuit 455 further has a control circuit 465 that monitors the output voltage $V_{OUT}$ and operates the switching network 460 to vary a turns ratio of the transformer $T_1$, thereby regulating the output voltage $V_{OUT}$ supplied to the load 490.

In the illustrated embodiment, the switching network 460 includes a regulation switch $S_3$. The switching network 460 further includes a regulation diode $D_1$ coupled between the first winding portion $SW_1$ and the regulation switch $S_3$. The illustrated switching network 460 includes only one additional winding portion and one regulation diode (the regulation diode $D_1$) and may thus be more economically employed in low power applications.

The power converter 400 operates as follows. The inverter 410 switches to provide power to the primary winding PW. The rectifying circuit 420 rectifies the waveform received from the second and third winding portions $SW_2$, $SW_3$ to establish a nominal rectified voltage delivered to the output filter 470. The regulation diode $D_1$ rectifies the waveform received from the first winding portion $SW_1$ to develop an additional voltage, which is delivered to the output filter 470 only when the regulation switch $S_3$ is conducting. Since the switching network 460 is only coupled to the first winding portion $SW_1$, the operation of the regulation switch $S_3$ should be coordinated with the switching of the inverter 410. For example, the conduction period of the regulation switch $S_3$ should coincide with the conduction period of the inverter switches Sa, $S_2$ of the inverter 210 to cause the output voltage $V_{OUT}$ to increase. The switching network 460 may thus vary a turns ratio of the secondary winding SW of the transformer $T_1$ and thereby regulate the output voltage $V_{OUT}$ of the power converter 400.

Figure 5:
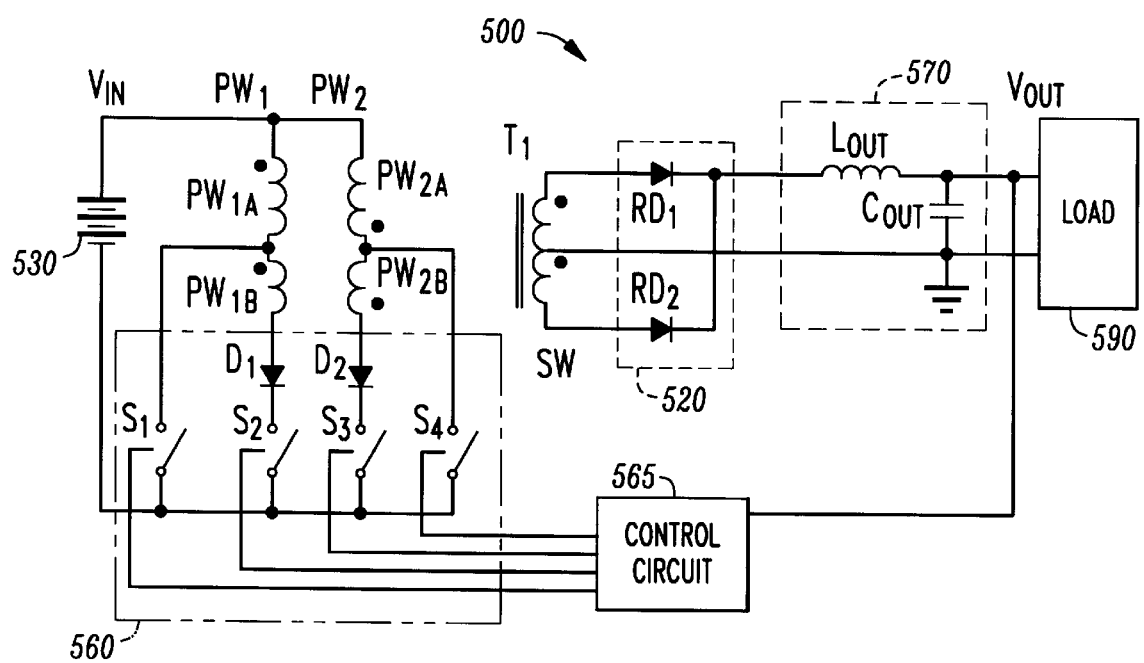
FIG. 5 illustrates a schematic diagram of yet another embodiment of a power converter constructed according to the principles of the present invention.

Turning now to FIG. 5, illustrated is a schematic diagram of yet another embodiment of a power converter 500 constructed according to the principles of the present invention. The power converter 500 includes a switching network 560 coupled to a DC power source 530. The power converter 500 further includes a transformer $T_1$ having first and second tapped primary windings $PW_1$, $PW_2$ (each having first and second winding portions $PW_{1A}$, $PW_{1B}$, $PW_{2A}$, $PW_{2B}$). The power converter 500 further includes a rectifying circuit 520 having first and second rectifying diodes $RD_1$, $RD_2$ coupled to a secondary winding SW of the transformer $T_1$. The power converter 500 further includes an output filter 570 having an output inductor $L_{OUT}$ and an output capacitor $C_{OUT}$ coupled to the rectifying circuit 520. The power converter 500 further includes a control circuit 565 that monitors the output voltage $V_{OUT}$ and operates the switching network 560 to regulate the output voltage $V_{OUT}$ provided to a load 590 coupled to the output of the power converter 500.

The switching network 560 embodies a regulation circuit constructed according to the principles of the present invention. The switching network 560 is coupled to the first and second tapped primary windings $PW_1$, $PW_2$. In the illustrated embodiment, the power converter 500 is a push-pull power converter. The switching network 560 includes first, second, third and fourth switches $S_1$, $S_2$, $S_3$, $S_4$ respectively coupled to the first and second tapped primary windings $PW_1$, $PW_2$. First and second diodes $D_1$, $D_2$ of the regulation circuit are respectively coupled to the first and second tapped primary windings $PW_1$, $PW_2$ to prevent reverse current flow through each of the respective windings.

The power converter 500 operates as follows. The second and third switches $S_2$, $S_3$ may alternately switch to apply the input voltage $V_{IN}$ across the transformer $T_1$. The second and third switches $S_2$, $S_3$ may be operated (e.g., at full duty cycle) to establish a nominal voltage delivered to the rectifier 520 and the output filter 570. The first and fourth switches $S_1$, $S_4$ may then be turned on, during the conduction period of the second and third switches $S_2$, $S_3$, respectively, to reduce the turns ratio of the respective first and second tapped primary windings $PW_1$, $PW_2$. The reduction in the turns ratio of the first and second tapped primary windings $PW_1$, $PW_2$ with respect to the secondary winding SW effectively increases the voltage across the secondary winding SW and, consequently, the output voltage $V_{OUT}$ at the output of the power converter 500.

Since operating the first switch $S_1$ during the conduction period of the second switch $S_2$ effectively removes the second switch $S_2$ from contributing to the power conversion process, the second switch $S_2$ need not be conducting while the first switch $S_1$ is conducting. Likewise, the fourth switch S4 effectively removes the third switch $S_3$ from the circuit. The power converter 500 may thus be operated in an interleaved manner wherein the first, second, third and fourth switches $S_1$, $S_2$, $S_3$, $S_4$ are alternate closed in a mutually exclusive and ordered fashion. Closing the first switch $S_1$ results in an increased voltage across the transformer $T_1$, while closing the second switch $S_2$ results in a decreased voltage applied across the transformer $T_1$. Similarly, during the other half of the cycle, closing the third switch $S_3$ results in a decreased voltage across the transformer $T_1$, while closing the fourth switch $S_4$ results in an increased voltage applied across the transformer $T_1$. The control circuit 565 may thus regulate the output voltage $V_{OUT}$ of the power converter 500.

Those skilled in the pertinent art should understand that the previously described embodiments of the power converter and regulation circuit are submitted for illustrative purposes only and other embodiments capable of providing regulation to the power converter by employing a switching network coupled to a tapped winding of the power converter are well within the broad scope of the present invention. For a better understanding of power electronics, including power rectifiers and boost converters, see *Power Electronics: Converters, Applications and Design,* by N. Mohan, T. M. Undeland and W. P. Robbins, John Wiley & Sons Publishing Company (1989), incorporated herein by reference.

Although the present invention has been described in detail, those skilled in the pertinent art should understand that they can make various changes, substitutions and alterations herein without departing from the spirit and scope of the invention in its broadest form.

What is claimed is:

1. For use with a voltage-fed power converter having an inverter switch adapted to continuously transfer power to a transformer, a regulation circuit, comprising:

a switching network, coupled to a tapped winding of said transformer, operable to vary a turns ratio of said transformer thereby regulating an output voltage of said power converter without substantially changing a duty cycle of said inverter switch, said switching network having a diode.

2. The regulation circuit as recited in claim 1 wherein said switching network comprises a regulation switch, coupled to said tapped winding, selected from the group consisting of:

a metal oxide semiconductor field-effect transistor;

a bipolar junction transistor;

an insulated gate bipolar transistors; and a gate turn-off thyristor.

3. The regulation circuit as recited in claim 1 wherein said tapped winding is a tapped secondary winding, said power converter further having a rectifier coupled to said tapped secondary winding, said switching network comprising:

first and second diodes coupled to opposing ends of said tapped winding; and a regulation switch coupled between said first and second diodes and an output of said power converter.

4. The regulation circuit as recited in claim 1 wherein said tapped winding is a first tapped primary winding, said transformer having a second tapped primary winding, said switching network comprising:

a diode and a regulation switch coupled to said first tapped primary winding; and a second diode coupled to said second tapped primary winding.

5. The regulation circuit as recited in claim 1 wherein said tapped winding is a tapped primary winding, said switching network comprising:

first and second regulation switches coupled to said tapped primary winding; and a diode coupled between one of said first and second regulation switches and said inverter switch.

6. The regulation circuit as recited in claim 1 wherein said power converter is selected from the group consisting of:

a push-pull power converter;

a half-bridge power converter; and a full-bridge power converter.

7. For use with a voltage-fed power converter having an inverter switch adapted to transfer power to a transformer, a method of regulating said power converter, comprising:

operating a switching network, coupled to a tapped winding of said transformer, to vary a turns ratio of said transformer thereby regulating an output voltage of said power converter without substantially changing a duty cycle of said inverter switch, said switching network having a diode.

8. The method as recited in claim 7 wherein said switching network comprises a regulation switch, coupled to said tapped winding, selected from the group consisting of:

a metal oxide semiconductor field-effect transistor;

a bipolar junction transistor;

an insulated gate bipolar transistors; and a gate turn-off thyristor.

9. The method as recited in claim 7 wherein said tapped winding is a tapped secondary winding, said power converter further having a rectifier coupled to said tapped winding, said switching network comprising:

first and second diodes coupled to opposing ends of said tapped secondary winding; and a regulation switch coupled between said first and second diodes and an output of said power converter.

10. The method as recited in claim 7 wherein said tapped winding is a first tapped primary winding, said transformer having a second tapped primary winding, said switching network comprising:

a diode and a regulation switch coupled to said first tapped primary winding; and a second diode coupled to said second tapped primary winding.

11. The method as recited in claim 7 wherein said tapped winding is a tapped primary winding, said switching network comprising:

first and second regulation switches coupled to said tapped primary winding; and a diode coupled between one of said first and second regulation switches and said inverter switch.

12. The method as recited in claim 7 wherein said power converter is selected from the group consisting of:

a push-pull power converter;

a half-bridge power converter; and a full-bridge power converter.

13. A voltage-fed power converter, comprising:

a transformer having a tapped winding;

a inverter switch adapted to transfer power from an input of said power converter to said transformer;

a regulation circuit, including:

a switching network, coupled to said tapped winding, operable to vary a turns ratio of said transformer thereby regulating an output voltage of said power converter without substantially changing a duty cycle of said inverter switch, said switching network having a diode.

14. The power converter as recited in claim 13 wherein said switching network comprises a regulation switch, coupled to said tapped winding, selected from the group consisting of:

a metal oxide semiconductor field-effect transistor;

a bipolar junction transistor;

an insulated gate bipolar transistors; and a gate turn-off thyristor.

15. The power converter as recited in claim 13 wherein said tapped winding is a tapped secondary winding, said power converter further comprising a rectifier coupled to said tapped secondary winding, said switching network comprising:

first and second diodes coupled to opposing ends of said tapped secondary winding; and a regulation switch coupled between said first and second diodes and an output of said power converter.

16. The power converter as recited in claim 13 wherein said tapped winding is a first tapped primary winding, said transformer further having a second tapped primary winding, said switching network comprising:

a diode and a regulation switch coupled to said first tapped primary winding; and a second diode coupled to said second tapped primary winding.

17. The power converter as recited in claim 13 wherein said tapped winding is a tapped primary winding, said switching network comprising:

first and second regulation switches coupled to said tapped primary winding; and a diode coupled between one of said first and second regulation switches and said inverter switch.

18. The power converter as recited in claim 13 wherein said power converter is selected from the group consisting of:

a push-pull power converter;

a half-bridge power converter; and a full-bridge power converter.

* * * * *